United States Patent [19]

Boinot et al.

[11] Patent Number: 5,004,789

[45] Date of Patent: Apr. 2, 1991

[54] NEW RESIN COMPOSITIONS BASED ON PHENOLIC RESINS

[75] Inventors: Francois Boinot, Lievin; Michel Cousin, Loison S/Lens; Pierre-Michel Francois, Bethune; Francois Michel-Dansac, Bully-Les-Mines, all of France

[73] Assignee: Societe Chimiques des Charbonnages S.A., Paris La Defense, France

[21] Appl. No.: 58,055

[22] Filed: Jun. 4, 1987

[30] Foreign Application Priority Data

Jun. 5, 1986 [FR] France .............................. 86 08127

[51] Int. Cl.$^5$ .................. C08C 8/28; C08K 3/38; B32B 3/02
[52] U.S. Cl. .................. 525/506; 525/504; 524/13; 524/95; 524/96; 524/405; 524/594; 427/389.8; 427/389.9; 428/96; 523/343; 156/355
[58] Field of Search .............. 525/504, 506; 524/13, 524/95, 96, 405, 594; 427/389.9, 389.8; 156/355; 428/96; 523/343; 528/140

[56] References Cited

U.S. PATENT DOCUMENTS

| | | | |
|---|---|---|---|
| 2,889,241 | 6/1959 | Gregory et al. | 156/355 |
| 4,045,398 | 8/1977 | Dahms | 524/96 |
| 4,105,604 | 8/1978 | Vargiu et al. | 524/13 |
| 4,123,414 | 10/1978 | Milette | 523/343 |
| 4,235,950 | 11/1978 | Miedaner | 427/389.3 |
| 4,555,544 | 11/1985 | Meyers | 524/95 |

FOREIGN PATENT DOCUMENTS 1569265  6/1970  Fed. Rep. of Germany .

*Primary Examiner*—John Kight, III
*Assistant Examiner*—P. Hampton-Hightower
*Attorney, Agent, or Firm*—Millen, White & Zelano

[57] ABSTRACT

Compositions of phenolic resins, for example, phenol formaldehyde resins, containing an additive of triethanolamine borate or an amine/oxygen-containing boron derivative mixture, e.g., triethanolamine and boric anhydride, are particularly useful for the manufacture of prepeg mats.

29 Claims, No Drawings

NEW RESIN COMPOSITIONS BASED ON PHENOLIC RESINS

CROSS REFERENCE TO RELATED APPLICATIONS

This application is related to commonly owned copending applications Ser. No. 762,482 filed Aug. 5, 1985 and Ser. No. 917,458, filed Oct. 10, 1986 now FWC 07/233,935 filed Ser. No. 8/18/88, now U.S. Pat. No. 4,962,166.

BACKGROUND OF THE INVENTION

The present invention relates to new resin compositions based on phenolic resins; it relates more especially to phenolic resin compositions which are especially suitable for the manufacture of "phenolic prepreg mats".

Prepregs are mixed materials which are prepared from thermosetting resins and reinforcements and optionally fillers. The reinforcement used is in the state of fibers, such as cellulose fibers or glass fibers, especially glass fiber rovings, of a non-woven made, for example, from high molecular weight polyester or from polyvinyl chloride, of glass fibre mat or fabric made, for example, from aromatic polyamide, from glass or from asbestos. These prepreg materials have the advantage of being able to be press-molded directly without the need to prepare a prior mixture consisting of resin, catalysts, fillers and pigments. Prepregs may be divided into two categories: on the one hand the so-called "non-flowing" prepregs, and on the other hand the so-called "flowing" prepregs. The "non-flowing" prepregs generally consist exclusively of glass fiber reinforcements impregnated with a suitable resin which is brought to an appropriate stage of partial polymerization, the so-called "B" stage. At this stage, the resins have virtually ceased to be tacky but are still soluble and fusible. Such a mixed material, placed in a heated press, permits movement of the resin between the fibers and leads to a uniform distribution of the glass and the resin, after the mold is closed, the resin is completely cured. Non-flowing prepregs are manufactured from epoxy resins, phenol-formaldehyde resins and also diallyl phthalate-based polyester resins. Such materials permit especially limited applications, since they most often have the disadvantage of becoming detached when used: they are used, for example, for the manufacture of printed circuits.

The known "flowing" prepregs, most often called "prepreg mats", are prepared, up to the present time, exclusively from a single category of resins, namely polyester resins. Depending on the technique of manufacture used, two varieties of "prepreg mats" are distinguished in particular.

SMC (sheet moulding compound) prepregs are mixed materials consisting of a fabric of chopped glass fibers preimpregnated with resin containing filler, pigment and catalyst. They are presented between two thin layers of film-forming material (for example polyethylene), which enables them to be handled easily. They are then fabricated into articles by compression molding.

Bulk molding compounds (BMC) are mixtures consisting of thermosetting resin, filler, and chopped glass fibers: they are presented in bulk or in hanks ready for use.

The prepreg mat thereby obtained possesses, after heat-curing, a consistency similar to that of leather or of a waxed cloth. After storage in a curing chamber, the prepreg mat thereby obtained can be stored for approximately three months, during which period it can be used hot pressure moulding.

The major difficulty which must be overcome in order to manufacture these prepreg mats based on polyester resins is to have a resin which is sufficiently fluid to be able to impregnate the chopped glass fiber mat, but in which the rise in viscosity during the first 48 hours (after which period the viscosity should remain virtually unchanged at room temperature) is sufficiently fast to be able to obtain a prepreg mat which has the desired consistency, which should be similar to that of leather or that of a waxed cloth, as stated above. It is hence seen that there are, in practice, two mutually opposing problems to be solved. In order to solve such problems, it is known to add to the polyester resin a thickener chosen from alkaline earth metal oxides, such as magnesium oxide. The addition of such a compound to the polyester resin enables a resin to be obtained which has a desired viscosity, and also sufficient stability to enable the resin not to thicken too quickly, the shortcoming of such rapid thickening being an unsatisfactory impregnation of the chopped glass fiber mats.

It is known from French Patent Application 84/12277 of Aug. 3, 1984, to manufacture pasty compositions which are suitable for the manufacture of phenolic prepreg mats by introducing an additive, consisting of at least 20% by weight, relative to the total weight of the additive, of an alkaline earth metal metaborate, into the mixture of phenolic resins consisting of resol, filler, pigments- and hardening agents.

It might have been thought that the simple replacement of the alkaline earth metal metaborates by organic borates such as boric acid esters, for example triethyl borate or tri-2-methoxyethyl) borate, would have enabled pasty compositions of phenolic resins suitable for the manufacture of phenolic prepreg mats to be obtained. Unfortunately, this is by no means the case. It is found, in effect, that the addition of these organic boron products to the phenolic resins leads to a very rapid rise in the viscosity, which results in a gelling of the resin solution in a few days.

SUMMARY OF THE INVENTION

The present invention relates to new compositions of phenolic resins which are suitable for the manufacture of phenolic prepreg mats, according to which compositions the compositions used for the impregnation of the mats of threads consist of phenol formaldehyde resins of the type comprising resols, fillers, pigments and hardening agents, characterized in that these compositions contain an additive consisting of an organic derivative chosen from triethanolamine borate or a mixture consisting of an amine and an inorganic oxygen-containing boron derivative chosen from boric acid or boric anhydride.

It has been found, in effect, that using such an additive enables a homogeneous resin composition to be obtained, a composition whose viscosity rises during the first forty-eight hours and then stabilizes. A composition is thereby obtained which is endowed with properties such to enable prepreg mats to be manufactured.

According to the invention, the resin compositions based on phenolic resins contain at most 30% and at least 1% by weight, relative to the weight of the phenolic resin solution, of an organic derivative chosen from triethanolamine borate or a mixture consisting of an amine and an inorganic oxygen-containing boron derivative. When a mixture consisting of an amine and an inorganic oxygen containing boron derivative is used, a mixture containing at most 70% by weight of amine is employed. The amines which are suitable are, according to the invention, butylamine, meta-xylenediamine, diethylamine, triethylamine, monoethylamine, diethanolamine, triethanolamine or aniline.

According to the invention, the resin compositions contain at most 30% by weight of an organic derivative chosen from the compounds mentioned above. When a mixture consisting of an amine and an inorganic oxygen-containing boron derivative is used, the amounts employed, expressed as a mole ratio, are such that the ratio $$\frac{\text{boron atoms}}{\text{nitrogen atoms}}$$

is between ¼ and 4 and preferably between ½ and 2.

The resin compositions which are the subject of the invention are prepared by adding the additive to the phenolic resin.

The curing of the phenolic resins is carried out in a known manner using catalyst solutions consisting of solvent and an acid: as acid, para-toluenesulphonic acid, ortho-toluenesulphonic acid, benzenesulphonic acid and xylenesulphonic acid may be mentioned, in particular. As organic solvents, compounds having alcohol groups are understood: methanol, ethanol, propanol and isopropanol, as well as polyols such as glycerol, dipropylene glycol and triethylene glycol. The known latent catalysts are more especially suitable for the manufacture of the compositions according to the invention. By latent catalysts, is meant catalysts which are virtually inactive at low temperatures but which become catalytically active at high temperatures, required for the polycondensation of the resin. As latent catalysts, there may be mentioned, for example, solutions consisting of an alkyl ester, a toluenesulphonic acid, an organic solvent and a toluenesulphonic acid or concentrated sulphuric acid. The amounts of hardener used are those traditionally employed for the curing of resols: these amounts are between 5 and 50% by weight relative to the weight of resol solution, and preferably between 10 and 40%.

The resols used for the manufacture of the compositions according to the invention are known resols, prepared, for example, by condensation of formaldehyde with phenol in the presence of an alkaline catalyst, followed by a neutralization using an acid. They have a mole ratio F/P of between 1.2 and 2.5, and optionally contain additives such as plasticizers, surfactants, and fillers such as silica, kaolin and aluminium hydroxide.

The compositions of phenolic resins which are the subject of the invention are especially suitable for the manufacture of phenolic prepreg mats. For the manufacture of the prepregs, reinforcing agents consisting of chopped glass fiber threads, chopped glass fiber rovings, polyamide fabrics, cellulose fibers or carbon fibers are used in a known manner. The amount of fibers used is such that the finished prepreg mat contains at most 70% of them by weight relative to the total weight of the finished material.

The compositions of phenolic resins which are the subject of the invention enable prepreg mats having very good flow to be manufactured; they also enable phenolic prepreg mats to be obtained which can be stored for at least two months before moulding at room temperature. In comparison with the known prepreg mats manufactured from unsaturated polyester resins, the phenolic prepreg mats have the advantage of possessing better flame resistance and resistance to combustion, thereby broadening their fields of application. In addition, the finished material has better thermal stability.

The prepreg mats obtained from the resin compositions which are the subject of the invention can be used after storage, in a known manner, by subjecting them, for example, in presses to pressures of between 40 and 140 bars for 20 to 200 seconds per millimeter of thickness at a temperature of between 110° and 160° C.

The examples which follow illustrate the present invention.

EXAMPLE 1

100 parts by weight of a phenolic resin which has the following characteristics are used:

$$\text{mole ratio } \frac{F}{P} = 1.5$$

dry extract: 80%
reactivity: 110° C.
viscosity at 20° C.: 80 Pa · s 26.6 parts of a catalyst consisting of a mixture of methanol and para-toluenesulphonic acid, manufactured from 1 mole of methanol and 1 mole of para-toluenesulphonic acid, are added to this resin. 17.4 parts of triethanolamine borate are then added to the reaction medium. A homogeneous composition is obtained which has a viscosity of 250 Pa.s. It then rises in the following manner:

| after one day: | 4,000 Pa.s |
| after 3 days: | 2,000 Pa.s |
| after 15 days: | 5,000 Pa.s |
| after 30 days: | 15,000 Pa.s |

EXAMPLE 2

100 parts by weight of a phenolic resin which has the following characteristics are used:

$$\text{mole ratio } \frac{F}{P} = 1.5$$

dry extract: 80%
reactivity: 110° C.
viscosity at 20° C.: 80 Pa · s 26.6 parts by weight of the same catalyst as used in Example 1, 6.84 parts by weight of boric acid and 16.53 parts by weight of triethanolamine are added to this resin. A homogeneous composition is obtained which has a viscosity of 40 Pa.s:

after 1 day the viscosity is 210 Pa.s
after 3 days the viscosity is 230 Pa.s
after 8 days the viscosity is 780 Pa.s
after 15 days the viscosity is 1,320 Pa.s
after 20 days the viscosity is 5,600 Pa.s
after 22 days the viscosity is 17,500 Pa.s

EXAMPLE 3

Example 2 is repeated, but replacing triethanolamine by diethylamine, butylamine, meta-xylenediamine and by triethylamine. The amounts of boric acid employed are the same as those used in Example 2. The same amount of the same catalyst used in Example 2 is employed.

Table 1 shows the results obtained.

EXAMPLE 4

Example 3 is repeated, employing the same resin and using 16.53 parts of triethanolamine and 3.85 parts of boric anhydride. The viscosity rises in the following manner:
- after 1 day it is 265 Pa.s
- after 3 days it is 280 Pa.s
- after 7 days it is 510 Pa.s
- after 11 days it is 960 Pa.s
- after 16 days it is 1,260 Pa.s
- after 31 days it is 10,200 Pa.s

EXAMPLE 5

By way of comparison, Example 1 is repeated but with triethanolamine borate replaced by various boron containing esters.

Table 2 summarizes the results obtained

EXAMPLE 6

100 parts by weight of the resin of Example 1 are employed to which 80 parts of an inorganic filler as well as the same catalyst and 16.53 parts by weight of triethanolamine and 6.84 parts of boric acid have been added. The initial viscosity is 62 Pa.s, and this then rises in the following manner:
- after 2 days: 1,500 Pa.s
- after 4 days: 5,000 Pa.s
- after 7 days: 20,000 Pa.s From this composition, a compound is prepared from 80 parts of the composition and 20 parts of glass fibers.

The product obtained, which can be stored, is molded at a pressure of 20 bars at a temperature of 150° C. for 6 minutes. After 3 days' curing, there is obtained after molding, a product 4 mm thick which has the following characteristics:

Flexural breaking stress (NFT Standard 51001): 55 MPa
Flexural modulus (NFT Standard 51001): 3,700 MPa

TABLE 1

| Amine, amount parts by weight | Viscosity Pa.s | | | | | |
|---|---|---|---|---|---|---|
| | 1 day | 3 day | 7 day | 11 day | 16 day | 24 day |
| Diethylamine: 8.08 | 55 | 100 | 142 | 260 | 332 | 12800 |
| Butylamine: 8.08 | 50 | 120 | 152 | 230 | 305 | 6500 |
| Meta-xylene-diamine: 7.86 | 17 | 20 | 122 | 230 | 328 | >16000 |
| Aniline: 10.29 | 600 | | | 6320 | >16000 | |
| Triethyl-amine: 11.18 | 25 | 29 | 54 | 90 | 100 | 540 |
| Diethanol-amine: 11.62 | 27.2 | | | 71 | | 452 |
| Monoethanol-amine: 6.75 | 45 | 120 | 390 | 840 | 1850 | >16000 |

TABLE 2

| Ester, amount parts by weight | Viscosity Pa.s | | | | | |
|---|---|---|---|---|---|---|
| | To (day) | $T_4$ | $T_5$ | $T_6$ | $T_{15}$ | $T_{38}$ |
| Triethyl borate: 16.15 | 2.7 | | | rubber-like mass | | |
| Triphenylborane phosphine: 30.56 | 40 | | rubber-like mass | | | |
| Methoxyboroxin 6.4 | 4.7 | rubber-like mass | | | | |
| Triethyl borate: 16.5 Triethanol-amine: 16.5 | 100 | | | | 26 | 100 |

We claim:

1. In a composition suitable for the manufacture of phenolic prepreg mats, said composition comprising a phenol formaldehyde resin of the resol type, the improvement wherein said composition contains, as an additive to said resin (a) triethanolamine borate or (b) a mixture of an amine and boric acid or boric anhydride, the atomic ratio of boron atoms/nitrogen atoms in the boric acid or anhydride/amine mixture being between ¼ and 4.

2. A composition according to claim 1, wherein said additive comprises said mixture and the atomic ratio $$\frac{\text{boron atoms}}{\text{nitrogen atoms}}$$

is between ½ and 2.

3. A composition according to claim 1 containing 1–30% by weight of said additive.

4. A composition according to claim 1, wherein said additive comprises said mixture and said mixture contains at most 70% by weight of the amine.

5. A composition according to claim 2 wherein said additive comprises said mixture and said mixture contains at most 70% by weight of the amine.

6. A composition according to claim 3, wherein said additive comprises said mixture and said mixture contains at most 70% by weight of the amine.

7. A composition according to claim 1 wherein the additive comprises triethanolamine borate.

8. A composition according to claim 5 wherein the additive comprises triethanolamine borate.

9. In a process of producing a prepreg mat, comprising impregnating a mat with a composition comprising a resol resin, the improvement comprising employing as an impregnating composition, the composition of claim 1.

10. In a process of producing a prepreg mat, comprising impregnating a mat with a composition comprising a resol resin, the improvement comprising employing as an impregnating composition, the composition of claim 2.

11. In a process of producing a prepreg mat, comprising impregnating a mat with a composition comprising a resol resin, the improvement comprising employing as an impregnating composition, the composition of claim 7.

12. In a process of producing a prepreg mat, comprising impregnating a mat with a composition comprising a resol resin, the improvement comprising employing as an impregnating composition, the composition of claim 10.

13. A prepreg mat produced by the process of claim 9.

14. A prepreg mat produced by the process of claim 10.

15. A prepreg mat produced by the process of claim 11.

16. A prepreg mat produced by the process of claim 12.

17. A composition according to claim 1, wherein said additive comprises said mixture and said amine is monoethanolamine, diethanolamine, diethylamine, butylamine, meta-xyleneamine, aniline or triethylamine.

18. In a process of producing a prepreg mat, comprising impregnating a mat with a composition comprising a resol resin, the improvement comprising employing as an impregnating composition, the composition of claim 17.

19. A prepreg mat produced by the process of claim 18.

20. A composition according to claim 1, further comprising as an acid curing catalyst para- or ortho-toluene sulfonic acid, benzene sulfonic acid, xylene sulfonic acid or concentrated sulfuric acid.

21. In a process of producing a prepreg mat, comprising impregnating a mat with a composition comprising a resol resin, the improvement comprising employing as an impregnating composition, the composition of claim 20.

22. A prepreg mat produced by the process of claim 21.

23. A process for producing the composition of claim 20, comprising providing said resol resin and adding said additive and said acid curing catalyst thereto.

24. A composition according to claim 1, wherein the amine contains only one nitrogen group.

25. In a process of producing a prepreg mat, comprising impregnating a mat with a composition comprising a resol resin, the improvement comprising employing as an impregnating composition, the composition of claim 24.

26. A prepreg mat produced by the process of claim 25.

27. A composition according to claim 1, wherein said additive comprises said mixture and said amine is monoethanolamine, diethanolamine, diethylamine, butylamine or triethylamine.

28. In a process of producing a prepreg mat, comprising impregnating a mat with a composition comprising a resol resin, the improvement comprising employing as an impregnating composition, the composition of claim 25.

29. A prepreg mat produced by the process of claim 21.

* * * * *